United States Patent [19]

Jeffery

[11] 4,410,269

[45] Oct. 18, 1983

[54] APPARATUS AND METHOD FOR TESTING A ROTATING POLYGON MIRROR

[75] Inventor: Edwin A. Jeffery, Natick, Mass.

[73] Assignee: Data General Corporation, Westboro, Mass.

[21] Appl. No.: 185,239

[22] Filed: Sep. 8, 1980

[51] Int. Cl.³ .................. G01B 11/26; G01B 11/30; G01P 3/40
[52] U.S. Cl. ............................. 356/138; 356/23; 356/371
[58] Field of Search .................. 356/23–26, 356/73, 138, 153, 371, 375, 124, 127; 350/6, 8; 250/224

[56] References Cited

U.S. PATENT DOCUMENTS 1,811,481  6/1931  Stone .......................... 356/23
4,180,329 12/1979  Hildebrand ................... 356/23

FOREIGN PATENT DOCUMENTS 494599  1/1976  U.S.S.R. ........................ 356/138

OTHER PUBLICATIONS

Isom, W. R. "Rotational Balancing Machine", Abstract Patent Application 5/1892, Pub. 11-18-52.

*Primary Examiner*—William H. Punter
*Attorney, Agent, or Firm*—Jacob Frank; Joel Wall; Irving M. Kriegsman

[57] ABSTRACT

An apparatus and method are disclosed for testing the faces of a polygon mirror for angular inclination and flatness while the polygon mirror is rotating at its intended operating speed. The apparatus includes an autocollimator for making the test readings, a strobe light for supplying light in the form of pulses to the autocollimator and a control mechanism including a laser, a light detector, a counter and a momentary contact switch for controlling the timing of the light pulses emitted by the strobe light so that the faces of the polygon mirror can be tested, one face at a time. The apparatus further includes a fiber optic probe which illuminates a unique number imprinted on the face illuminated through the autocollimator with light pulses directly from the strobe light so that the face that is being illuminated can be identified. Angular inclination is tested by observing the displacement of the light beam reflected by the face being tested relative to the outgoing beam and flatness is tested by observing the focus of the reflected beam.

6 Claims, 3 Drawing Figures

APPARATUS AND METHOD FOR TESTING A ROTATING POLYGON MIRROR

BACKGROUND OF THE INVENTION

The present invention relates generally to a method and apparatus for testing polygon mirrors and more particularly to a method and apparatus for testing the angular inclination and flatness of the individual faces of a polygon mirror while the polygon mirror is rotating at its intended operating speed.

Polygon mirrors and well known in the art and widely used in optical reading systems, optical recording systems, optical printing systems and the like for producing a rotating beam of light. Polygon mirrors in which the mirror faces are adjustably attached to the sides of the polygon, such as by spring biased screws, are also well known in the art. Some of the advantages of polygon mirrors having adjustably attached mirror faces as opposed to mirror faces that are integrally formed on the sides of the polygon are that they are less expensive to manufacture, that the individual faces can be accurately adjusted to the proper angle and that if a face is or becomes scratched or unuseable for any reason it can be easily replaced without having to replace the entire polygon. Polygon mirrors having adjustable faces are especially useful in applications such as disclosed in U.S. Pat. No. 4,043,632 to Edwin A. Jeffery and Sigmond Hinlein wherein the individual mirror faces are inclined at different angles, which patent is incorporated herein by reference for its disclosure of a polygon mirror having adjustable faces.

For many applications it is necessary that the angular inclination, or pyramidal angle as it is commonly called, of the individual faces be accurate to within ±5 seconds of arc and that the flatness of the individual faces be within wavelengths. Therefore, it is important that polygon mirrors be tested to see if these parameters are within the acceptable limits. It has been found that there is usually some movement in the positioning of the mirror faces of a polygon mirror having adjustable faces when the polygon mirror is brought up to its intended operating speed. The movement may be the result of distortions produced by centrifugal force as the polygon rotates or by stretching or movement of the screws or bearings or springs that are used to attach the faces to the polygon. For example, a movement of a mirror face of about 5 millionths of an inch will produce an angular error in the order of about one second of arc on a face of one inch width. Consequently, in order to accurately test polygon mirrors having adjustable faces it is essential that the tests be conducted while the polygon mirror is rotating at its intended operating speed.

In the past, the testing of such polygon mirrors has been achieved by masking off every face of the polygon mirror except the one to be tested, bringing the polygon mirror up to its intended operating speed, illuminating the polygon mirror with a continuous beam of light and then observing the location of the deflected beam on a screen located at a large distance, such as for example 60 feet, from the polygon mirror. Because of the large distance between the polygon mirror and the screen, small angular errors can be easily observed. One of the disadvantages of such an arrangement is that it requires a relatively large amount of space and is hence cumbersome. Another disadvantage of such an arrangement is that because the screen is located at a large distance from the polygon mirror the system is subject to errors caused by air movement and errors caused by differential vibrations of the different mounting structures for the polygon mirror, the screen and the light source. Still another disadvantage of such an arrangement is that it requires physically masking off each face except the one being tested, bringing the polygon mirror up to operating speed to make the test readings and then stopping the polygon mirror so that the particular face that is masked can be changed. Yet still another disadvantage of such an arrangement is that it is generally useful only for testing for pyramidal errors.

Accordingly, the need exists for a new and improved technique for testing the faces of a polygon mirror while the polygon mirror is rotating at its intended operating speed and more particularly a technique that overcomes the disadvantages in the prior art technique enumerated above. The present invention provides such a technique.

SUMMARY OF THE INVENTION

Apparatus for testing the faces of a polygon mirror while the polygon mirror is rotating at its intended operating speed according to the teachings of this invention includes a light source for generating light in the form of light pulses, an autocollimator for making test readings of the faces using light supplied from said light source and a control mechanism for controlling the timing of the light pulses emitted by the light source so that each face of the polygon mirror can be tested, one face at a time.

The method of the invention comprises providing an autocollimator for testing the faces of the polygon mirror, providing a light source of the type that generates light in the form of light pulses for supplying light to the autocollimator and controlling the timing of the light pulses emitted by the light source so that each face of the polygon mirror can be tested, one face at a time.

It is therefore an object of this invention to provide a new and improved method and apparatus for testing the faces of a polygon mirror.

It is another object of this invention to provide a new and improved method and apparatus for testing the faces of a polygon mirror, one face at a time, while the polygon mirror is rotating at its intended operating speed.

It is still another object of this invention to provide a new and improved method and apparatus for testing the angular inclination of the faces of polygon mirror, one face at a time, while the polygon mirror is rotating at its intended operating speed.

It is yet still another object of this invention to provide a new and improved method and apparatus for testing the flatness of the faces of a polygon mirror, one face at a time, while the polygon mirror is rotating at its intended operating speed.

It is another object of this invention to provide a new and improved method and apparatus for testing the faces of a polygon mirror, one face at a time, while it is rotating at its intended operating speed, without having to block or mask off all the faces in the polygon except the one being tested.

It is still another object of this invention to provide a new and improved method and apparatus illuminating one face at a time of polygon mirror while it is rotating at its intended operating speed.

It is yet still another object of this invention to provide a method and apparatus for testing the faces of a polygon mirror, one face at a time, while the polygon mirror is rotating at its intended operating speed which is compact, extremely reliable and not subject to differential vibrations or air movements.

It is another object of this invention to provide a new and improved method and apparatus for controlling the triggering of a pulsating light source so that the light emitted by said light source will illuminate the faces of a rotating polygon mirror, one face at a time.

For a better understanding of the present invention, together with other and further objects hereof, reference is made to the following detailed description, taken in connection with the accompanying drawings, and its scope will be pointed out in the appended claims.

BRIEF DESCRIPTION OF THE DRAWINGS

In the drawings wherein like reference numerals represent like parts.

DETAILED DESCRIPTION OF THE PREFERRED EMBODIMENT

The present invention is related to a method and apparatus for testing the angular inclination and flatness of the faces of a polygon mirror while the polygon mirror is rotating at its intended operating speed. The invention accomplishes this by using an autocollimator to make the test readings, supplying light to the autocollimator from a light source of the type which generates light in the form of light pulses and then controlling the timing of the light pulses so that (1) only one face of the polygon mirror is illuminated at a time, (2) the particular face that is illuminated can be changed so that each one of the faces can be tested and (3) the face is illuminated for testing when it is in an angular position such that at least some of the light is reflected back into the autocollimator.

Figure 1:
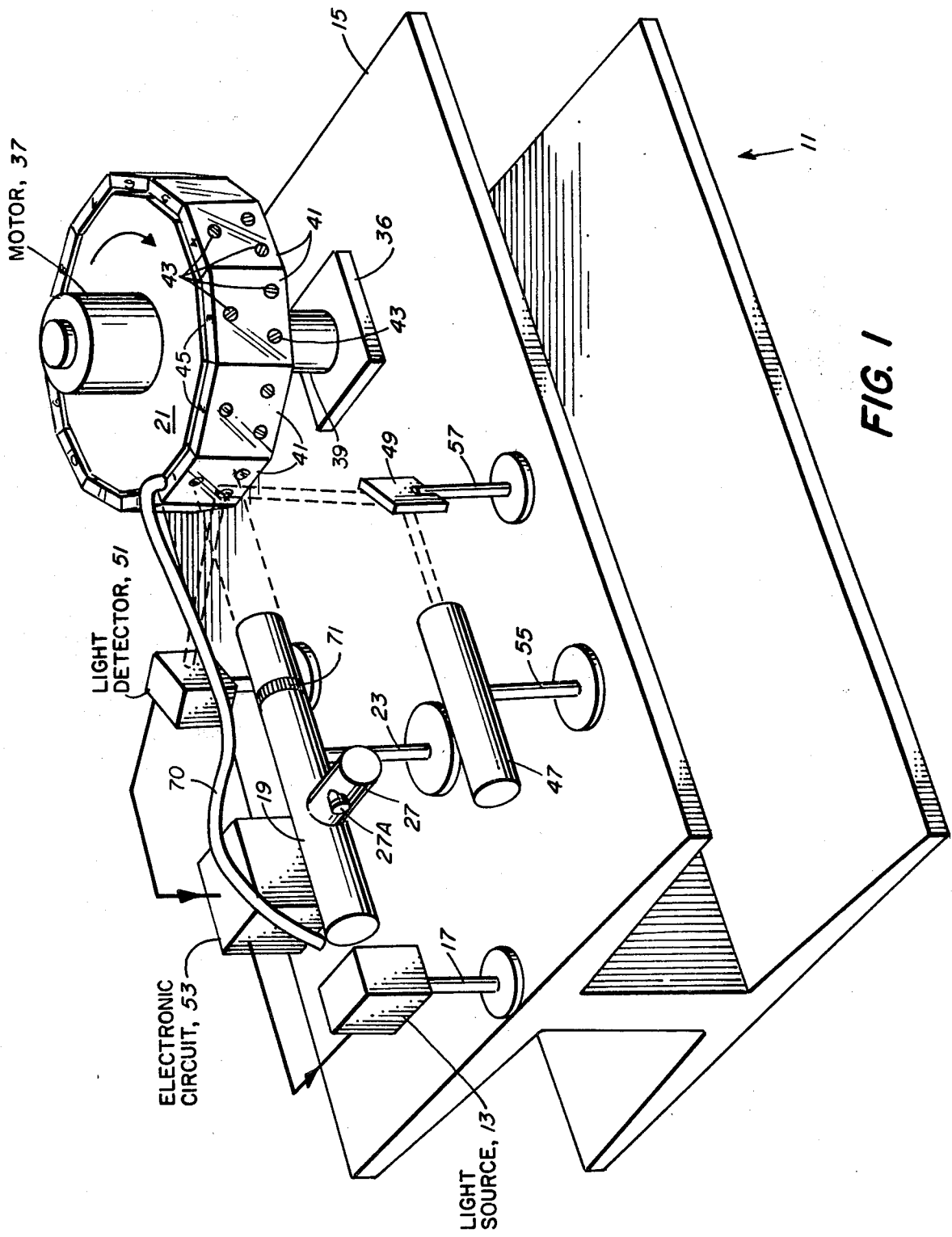
FIG. 1 is a pictorial schematic representation of an apparatus constructed according to the teachings of this invention for testing the faces of a rotating polygon mirror.

Referring now to FIG. 1, there is shown an apparatus for testing the angular inclination and flatness of a rotating polygon mirror, which apparatus is identified generally by reference numeral 11. The apparatus 11 includes a light source 13 of the type which generates light in the form of a series of light pulses. Light source 13 may comprise a conventional strobe light. Alternatively, light source 13 may comprise a flashlamp or a light-emitting semiconductor device such as a gallium arsenide diode. Light source 13 is mounted on a base member 15 by a support member 17. Base member 15 may comprise an "I" beam.

Light emitted by light source 13 is passed into an autocollimator 19 which converts the light received into a collimated beam which is directed to the polygon mirror 21 being tested. Autocollimator 19 is mounted on base member 15 by a support member 23 and is positioned so that its optical axis is normal to the axis of rotation of polygon mirror 21. Autocollimator 19 is a conventional autocollimator of the type which includes an adjustable objective lens. An example of such an autocollimator is the Nikon autocollimator model 6D manufactured by Nippon Kogaku K.K. of Tokyo, Japan.

Figure 2:
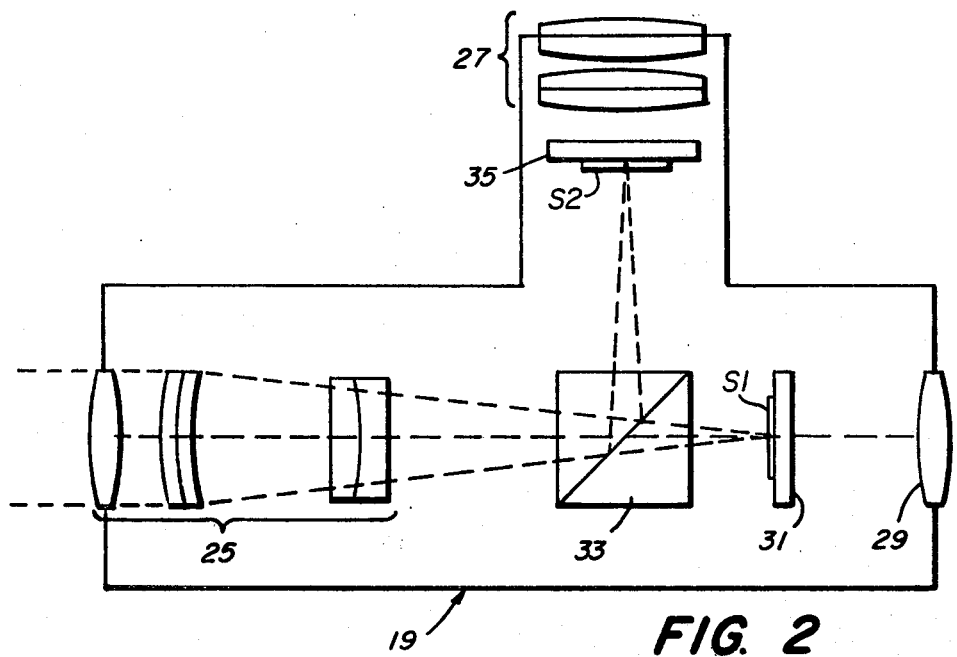
FIG. 2 is an optical diagram of the autocollimator shown in FIG. 1.

Referring now to FIG. 2, autocollimator 19 includes an objective lens system 25 which is adjustable, an eyepiece 27 which together with objective lens system 25 constitute an optical system of a telescope, a condensing lens 29, a first glass plate 31 having engraved thereon a set of scales S1, a 45° inclined half-reflecting prism 33 and a second glass plate 35 having engraved thereon a set of scales 52. Eyepiece 27 includes an adjustable micrometer scale 27A (see FIG. 1) for measuring fractional values less than one minute. Autocollimator 19 operates in a conventional manner. Thus, light received from light source 13 is condensed by condenser lens 29, and then transmitted through prism 33 into objective lens system 25 where it is projected out in the form of a collimated beam. Light reflected back from the polygon mirror 21, assuming the face illuminated is about normal to the optical axis of the outgoing beam, passes through the objective lens system 25 and prism 33 producing on the second glass plate 35 which is located at the focal plane of the objective lens system 25 an image of the scale S1 from the first glass plate 31. By observing the location of the reflected beam relative to the outgoing beam, the angular inclination of the mirror face illuminated by the outgoing beam can be determined. By observing the focus of the returned beam, the flatness of the mirror face can be determined.

Referring now back to FIG. 1, polygon mirror 21 is mounted on base member 15 by a bearing support member 36 and is driven at its intended rotational speed, such as 1800 RPM, by a constant speed motor 37 which is connected to the drive shaft 39 of polygon mirror 21. As can be seen, polygon mirror 21 includes a plurality of mirror faces 41 which are each adjustably attached to the body of polygon mirror 21 by three spring biased mounting screws 43. By tightening or loosening the three mounting screws by different amounts the angular inclination of the mirror face can be easily adjusted or changed. A unique number 45 is imprinted on the top of each mirror face 41 for identification purposes. Polygon mirror 21 may be model number 0612 polygon mirror manufactured by Scanco Inc. of Norwalk, Conn.

Apparatus 11 further includes a control mechanism for controlling the timing of the light pulses emitted by light source 13 so that (1) only one face of polygon mirror 21 is illuminated at a time, (2) the face is illuminated when it is about normal to the optical axis of autocollimator 19 and (3) the particular facing being illuminated can be changed so that each face on the polygon mirror 21 can be tested. The control mechanism includes a light source 47 for generating a continuous beam of light, a mirror 49 for deflecting the beam of light from light source 47 onto polygon mirror 21, a light detector 51 positioned in the scan line of the light beam from light source 47 that is deflected by polygon mirror 21 and an electronic circuit 53 coupled between light detector 51 and light source 13 for triggering light source 13 at the correct times in response to the signals received from light detector 51.

Light source 47 may comprise a helium-neon laser which produces a continuous collimated beam of light and is mounted on base member 15 by a support member 55. Mirror 49 is mounted on base 15 by a support member 57 and is angularly positioned so that the light beam from light source 47 strikes the mirror face that is in front of autocollimator 19. Light detector 51, which may comprise a conventional photomultiplier tube or a photomultiplier tube is mounted on base member 15 by a support member 59 and is positioned to intercept the deflected light beam when the mirror face producing the deflected light beam is normal to the optical axis of autocollimator 19. Thus, each time a mirror face is normal to optical axis an electrical pulse signal is generated by light detector 51. Light detector 51 may be masked off by suitable means such as a plate with a vertical slit (not shown) so that the electrical signal emitted will be in the form of sharp pulses.

Figure 3:
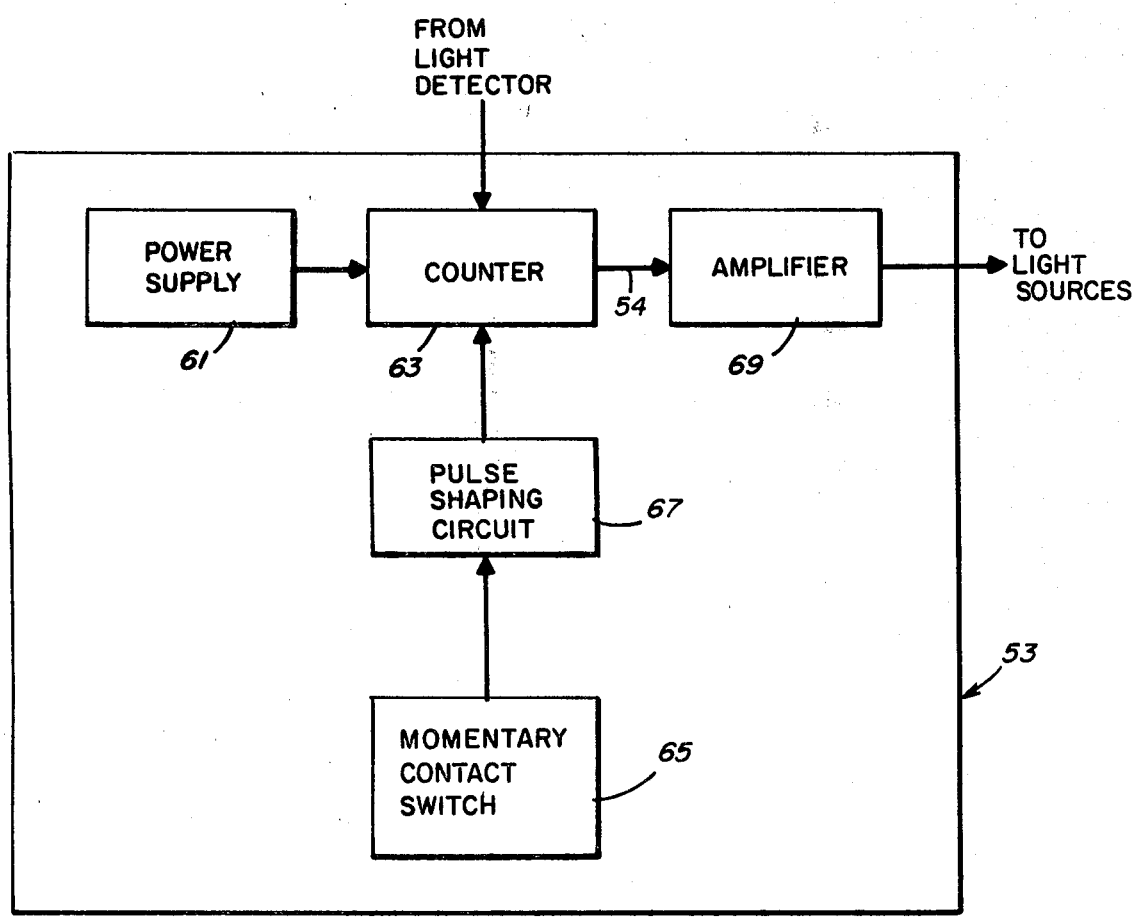
FIG. 3 is a block diagram of the box labelled "electronic circuit" in FIG. 1.

Electronic circuit 53, which is shown in detail in FIG. 3, comprises a power supply 61, a counter 63, a manually operated, momentary contact switch 65, a pulse shaping circuit 67 and an amplifier 69.

Power supply 61 supplies the power for triggering light source 13. Counter 63 receives electrical signal inputs from light detector 51 and momentary contact switch 65 and has its output 54 connected to light source 13 through amplifier 69. Pulse shaping circuit 67 shapes the signals received from momentary contact switch 65 so that it is a sharp pulse.

Counter 63 counts the electrical signal pulses emitted by light detector 51 and when the count is equal to the number of faces on polygon mirror 21 emits a signal which is amplified by amplifier 69 and then used to trigger light source 13. For example, if polygon mirror 21 has twelve faces, counter 63 is a counter designed to emit a trigger signal when the number of pulse signals counted is equal to twelve. Thus, a trigger signal is supplied to light source 13 in a manner such that only one face is illuminated at a time. The particular face that is illuminated is changed by depressing the momentary contact switch 65 which causes an additional electrical pulse signal to be applied to counter 63. For example, if counter 63 is a divide by twelve counter and momentary contact switch 65 is depressed once, the count will reach twelve after eleven pulse signals are received from light detector 51 causing the trigger signal to effectively "jump" to the next mirror face and then stay at that face. By repeating this procedure, each face on the polygon mirror can be tested in order.

Finally, apparatus 11 includes a fiber optic probe 70 for conducting a portion of the light emitted by light source 13 to the top of the mirror face directly in front of autocollimator 21 so that the number 45 on the top of the face can be illuminated. Thus, each time a light pulse is sent out through autocollimator 21, the top of the mirror face being illuminated is also illuminated revealing the number 45 on the face that is being tested.

Angular inclination is tested by observing the location of the image of the scales S1 on glass plate 31 relative to the scales S2 on glass plate 35 produced by reflection off the mirror face being tested. Flatness is tested by adjusting the objective lens system 25 until the image of the scales S2 is in sharp focus. This is achieved by adjusting the parallax compensator scale 71 on the barrel of autocollimator 19. The amount by which parallax compensator 71 has to be adjusted is indicative of the flatness. If light source 13 is in the form of a strobe light, the length of the strobe light pulse is such that it is only possible generally to obtain a sharp focus of one of the scales S1 and hence test for flatness in only one direction, that direction being curvature about a horizontal axis (i.e. in a vertical direction).

It is to be understood that although the invention has been described with reference to testing a polygon mirror having adjustable faces, it is equally applicable for use in testing polygon mirrors having integrally formed faces. It is also to be understood that various modifications and changes may be made as fall within the spirit and scope of the invention as set forth in the appended claims.

What is claimed is:

1. Apparatus for testing the angular inclination and/or flatness of the faces of a polygon mirror while said polygon mirror is rotating comprising:
    a. an autocollimator positioned in optical alignment with said faces of said polygon mirror,
    b. a first light source for supplying light to said autocollimator in the form of light pulses,
    c. a second light source for generating a continuous beam of light in the direction of said faces of said polygon mirror,
    d. a light detector along the scan line of the deflected continuous beam of light and producing an electrical pulse signal each time said deflected continuous beam of light impinges thereon,
    e. a counter for counting the electrical pulse signals emitted by said light detector and generating a trigger signal for triggering said first light source when the count is equal to the number of faces on said polygon mirror,
    f. a momentary contact switch for incrementing said counter so as to change occurrence of the trigger signal, and
    g. means for ascertaining which face of said polygon mirror is illuminated by said first light source.

2. Apparatus for testing the faces of a polygon mirror while said polygon mirror is rotating at its intended operating speed comprising:
    a. a first light source for generating light in the form of light pulses,
    b. an autocollimator for receiving light from said first light source, converting said light into a collimated beam, directing said collimated beam onto said polygon mirror and providing a visual indication of the light beam reflected back by said polygon mirror into said autocollimator,
    c. control means coupled to said first light source for controlling the timing of the light pulses emitted by said first light source so that only one face of said polygon mirror is illuminated,
    d. said control means comprising:
        i. a second light source for generating a continuous beam of light, in the direction of said polygon mirror,
        ii. a light detector disposed along the scan line of the deflected continuous beam of light, said light detector producing an electrical pulse signal each time said deflected continuous beam of light impinges thereon, and
        iii. an electronic circuit for counting the number of electrical pulse signals emitted by said light detector and generating a trigger signal for triggering said first light source each time the number counted is equal to the number of faces in the polygon mirror,
    e. said electronic circuit including a counter for counting the electrical pulse signals and a momentary contact switch for incrementing said counter, when desired, so that the particular face illuminated by said light pulses can be changed.

3. The apparatus of claim 1 and wherein said first light source is a strobe light.

4. The apparatus of claim 3 and wherein said light detector is a phototube.

5. The apparatus of claim 4 and wherein said second light source is a laser.

6. The apparatus of claim 5 and wherein each face of said polygon mirror includes a unique marking and wherein said apparatus further includes a light conductor for conducting some of the light emitted by said strobe light to said face illuminated through said autocollimator so that said face that is illuminated can be identified.

* * * * *